(12) United States Patent
Chen et al.

(10) Patent No.: US 12,284,670 B2
(45) Date of Patent: Apr. 22, 2025

(54) REPORTING UPLINK LISTEN-BEFORE-TALK FAILURE

(71) Applicant: Apple Inc., Cupertino, CA (US)

(72) Inventors: Yuqin Chen, Beijing (CN); Chunhai Yao, Beijing (CN); Dawei Zhang, Saratoga, CA (US); Fangli Xu, Beijing (CN); Haijing Hu, Los Gatos, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 334 days.

(21) Appl. No.: 17/759,788

(22) PCT Filed: Feb. 12, 2020

(86) PCT No.: PCT/CN2020/074904
§ 371 (c)(1),
(2) Date: Jul. 29, 2022

(87) PCT Pub. No.: WO2021/159319
PCT Pub. Date: Aug. 19, 2021

(65) Prior Publication Data
US 2023/0061643 A1 Mar. 2, 2023

(51) Int. Cl.
*H04W 74/00* (2009.01)
*H04W 74/0808* (2024.01)
*H04W 74/0833* (2024.01)

(52) U.S. Cl.
CPC ..... *H04W 74/004* (2013.01); *H04W 74/0808* (2013.01); *H04W 74/0833* (2013.01)

(58) Field of Classification Search
CPC ........... H04W 74/004; H04W 74/0808; H04W 74/0833; H04W 24/08; H04W 24/10
See application file for complete search history.

(56) References Cited

U.S. PATENT DOCUMENTS 11,553,530 B2 * 1/2023 Agiwal ................ H04W 76/15
2016/0302256 A1 10/2016 Susitaival et al.
(Continued)

FOREIGN PATENT DOCUMENTS

CN 107371168 11/2017
CN 107682931 2/2018
(Continued)

OTHER PUBLICATIONS

OPPO, "Report of offline-403—Remaining issues of consistent UL LBT failure", 3GPP TSG-RAN WG2, Meeting #108, R2-1916382, Nov. 23, 2019, 11 sheets.

*Primary Examiner* — Charles C Jiang
*Assistant Examiner* — Shawn D Miller
(74) *Attorney, Agent, or Firm* — Fay Kaplun & Marcin, LLP

(57) ABSTRACT

The exemplary embodiments relate to a user equipment (UE) delivering an indication of one or more uplink listen-before-talk (LBT) failures to a network. The UE may identify a predetermined condition corresponding to one or more uplink listen-before-talk (LBT) failures associated with a special cell (SpCell). The UE is triggered to provide an indication of uplink LBT failure associated with the SpCell to the network based on the predetermined condition. Next, the UE may determine a type of message that is to be used to deliver the indication of uplink LBT failure associated with the SpCell to the network. The UE may transmit the type of message including the indication of uplink LBT failure associated with the SpCell to the network. Subsequently, the UE may determine that the network received the indication of uplink LBT failure associated with the SpCell.

19 Claims, 5 Drawing Sheets

(56) References Cited

U.S. PATENT DOCUMENTS

| | | |
|---|---|---|
| 2016/0338136 A1 | 11/2016 | Zhang et al. |
| 2018/0124612 A1* | 5/2018 | Babaei ................. H04W 72/23 |
| 2018/0176961 A1 | 6/2018 | Babaei et al. |
| 2019/0215756 A1 | 7/2019 | Park et al. |
| 2021/0144761 A1* | 5/2021 | Chin ................. H04W 74/0808 |

FOREIGN PATENT DOCUMENTS

| | | |
|---|---|---|
| CN | 110324908 | 10/2019 |
| EP | 4046456 | 8/2022 |
| EP | 4082281 | 11/2022 |
| KR | 20170093071 | 8/2017 |
| WO | 2017136458 | 8/2017 |
| WO | 2019/240512 | 12/2019 |
| WO | 2021/089040 | 5/2021 |
| WO | 2021/139729 | 7/2021 |

* cited by examiner

REPORTING UPLINK LISTEN-BEFORE-TALK FAILURE

BACKGROUND

A user equipment (UE) may connect to a network that supports communication in the unlicensed spectrum. When connected, the UE may utilize a listen-before-talk (LBT) procedure for uplink channel access. If one or more LBT procedures fail, the UE may report the one or more uplink LBT failures to the network. However, under conventional circumstances, the uplink resources that are assigned to the UE for reporting the one or more uplink LBT failures may not be large enough to accommodate the information indicating the occurrence of the one or more uplink LBT failures.

SUMMARY

According to an exemplary embodiment a method is performed at a user equipment (UE) connected to a network. The method includes identifying a predetermined condition corresponding to one or more uplink listen-before-talk (LBT) failures associated with a special cell (SpCell). The UE is triggered to provide an indication of uplink LBT failure associated with the SpCell to the network based on the predetermined condition. The method also includes determining a type of message that is to be used to deliver the indication of uplink LBT failure associated with the SpCell to the network, transmitting the type of message including the indication of uplink LBT failure associated with the SpCell to the network and determining that the network received the indication of uplink LBT failure associated with the SpCell.

Further exemplary embodiments include a user equipment (UE) that includes a transceiver and a processor. The transceiver is configured to communicate with a network. The processor is configured to perform operations including identifying a predetermined condition corresponding to one or more uplink listen-before-talk (LBT) failures associated with a special cell (SpCell). The UE is triggered to provide an indication of uplink LBT failure associated with the SpCell to the network based on the predetermined condition. The operations also include, determining a type of message that is to be used to deliver the indication of uplink LBT failure associated with the SpCell to the network, transmitting the type of message including the indication of uplink LBT failure associated with the SpCell to the network and determining that the network received the indication of uplink LBT failure associated with the SpCell.

Still further exemplary embodiments include an integrated circuit. The integrated circuit includes circuitry configured to identify a predetermined condition corresponding to one or more uplink listen-before-talk (LBT) failures associated with a special cell (SpCell). A UE is triggered to provide an indication of uplink LBT failure associated with the SpCell to the network based on the predetermined condition. The integrated circuit also includes, circuitry configured to determine a type of message that is to be used to deliver the indication of uplink LBT failure associated with the SpCell to the network, circuitry configured to transmit the type of message including the indication of uplink LBT failure associated with the SpCell to the network and circuitry configured to determine that the network received the indication of uplink LBT failure associated with the SpCell.

DETAILED DESCRIPTION

Figure 1:
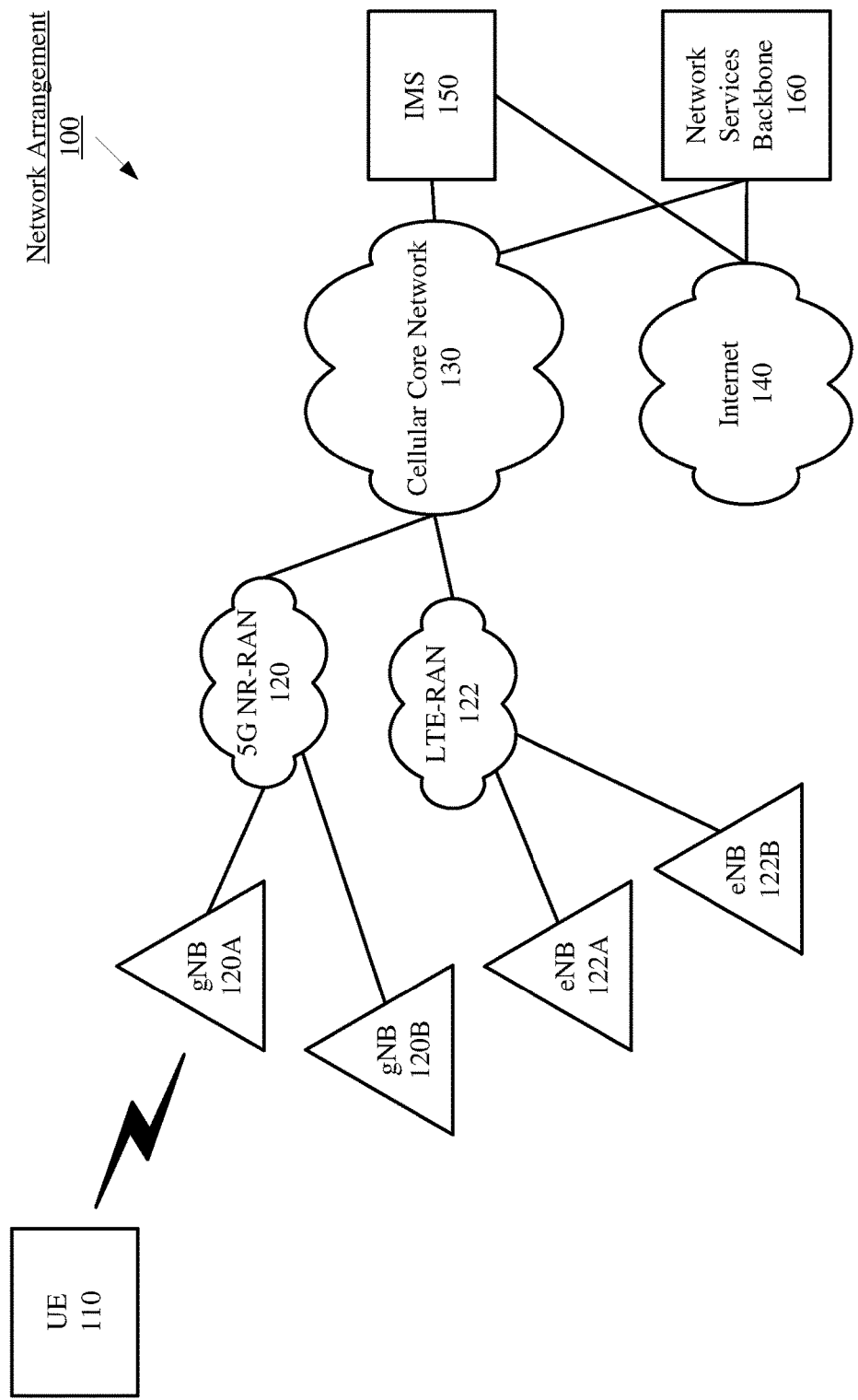
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) delivering an indication of one or more uplink listen-before-talk (LBT) failures to a network.

The exemplary embodiments are described with regard to the UE. However, reference to a UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The UE may be configured to communicate with the network using the unlicensed spectrum. To access the unlicensed spectrum, the UE may execute an LBT procedure. Those skilled in the art will understand that LBT generally refers to a mechanism that senses whether a communication channel is clear prior to transmitting a signal over the communication channel. Channel sensing may include monitoring the energy level on one or more sub-bands of a communication channel. However, the manner in which the LBT procedure is performed is beyond the scope of the exemplary embodiments. Instead, the exemplary embodiments relate to reporting the occurrence of one or more uplink LBT failures to the network. Thus, any reference to an LBT procedure is used to represent any procedure in which the UE, directly or indirectly, determines whether a communication channel is available prior to transmitting a signal over that communication channel.

The UE may initiate the LBT procedure to transmit information and/or data over an unlicensed band to a cell of the corresponding network. However, when the UE initiates the LBT procedure, the unlicensed band may be filled with other traffic. As a result, the configured uplink communication channel may be busy, and the UE may not perform the transmission. This type of scenario may be referred to as an LBT failure. The above example is merely provided for illustrative purposes. Throughout this description, the term "LBT failure" may refer to any instance in which the UE initiates an LBT procedure but does not perform the corresponding transmission.

If the UE experiences one or more LBT failures, the UE may attempt to establish an uplink communication channel on a different bandwidth part (BWP) via a random access channel (RACH) procedure. Conventionally, the process of establishing the uplink communication channel on the different BWP may include reporting an indication of the one or more uplink LBT failures to the network. However, for any of a variety of different reasons, the uplink resources that are configured to be utilized by the UE for reporting the one or more uplink LBT failures may not be large enough to accommodate the information indicating the occurrence of the one or more uplink LBT failures.

As mentioned above, the manner in which the LBT procedure is performed is beyond the scope of the exemplary embodiments. Similarly, the manner in which the UE determines to stop attempting LBT procedures on a particular unlicensed band and/or release the corresponding uplink communication channel is also beyond the scope of the exemplary embodiments. Instead, the exemplary embodiments relate to how the UE delivers an indication of one or more of uplink LBT failures. Throughout this description, any reference to a particular set of circumstances triggering the UE to report the one or more uplink LBT failures is merely provided for illustrative purposes. The exemplary embodiments may apply to any appropriate one or more factors triggering the UE to deliver the indication of one or more uplink LBT failures to the network.

The exemplary embodiments are described with regard to the network being a fifth generation (5G) new radio (NR) network and the UE delivering the indication of one or more uplink LBT failures using a medium access control (MAC) control element (CE). Those skilled in the art will understand that a MAC CE may be used for MAC layer signaling between the UE and a cell of a network. However, any reference to 5G NR and a MAC CE is merely provided for illustrative purposes, the exemplary embodiments may apply to any appropriate network and utilize any appropriate signaling mechanism.

Throughout this description, the MAC CE may be characterized as being used to deliver an indication of special cell (SpCell) uplink LBT failure. Those skilled in the art will understand that a SpCell is a type of cell used in carrier aggregation (CA) and/or multi-radio access technology dual connectivity (MRDC). Throughout this description, MRDC may generally refer to a configuration in which the UE 110 may transmit and/or receive on a plurality of component carriers (CCs) corresponding to cells associated different RATs.

In a first aspect, the exemplary embodiments will describe various mechanisms for delivering a MAC CE to the network that includes an indication of one or more uplink LBT failures associated with a SpCell. In a second aspect, the exemplary embodiments relate to determining that the network received the SpCell LBT failure MAC CE. However, the exemplary embodiments are not limited to the delivery of a SpCell uplink LBT failure MAC CE in a 5G NR network. The exemplary techniques described herein may be used with currently implemented techniques for LBT failure reporting, future implementations of techniques for LBT failure reporting or independently from other LBT failure reporting.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120 and an LTE radio access network (LTE-RAN) 122. However, it should be understood that the UE 110 may also communicate with other types of networks (e.g. legacy cellular network, WLAN, etc.) and the UE 110 may also communicate with networks over a wired connection. With regard to the exemplary embodiments, the UE 110 may establish a connection with the 5G NR-RAN 120 and/or the LTE-RAN 122. Therefore, the UE 110 may have both a 5G NR chipset to communication with the 5G NR-RAN 120 and an LTE chipset to communicate with the LTE-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120 and 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

As mentioned above, the exemplary embodiments relate to CA and MRDC. Thus, in some embodiments, the UE 110 may be connected to both the 5G NR-RAN 120 and the LTE-RAN 122. However, reference to separate 5G NR-RAN 120 and LTE-RAN 122 is merely provided for illustrative purposes. An actual network arrangement may include a radio access network that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services. The NG-RAN may be connected to at least one of the evolved packet core (EPC) or the 5G core (5GC). Thus, in one exemplary configuration, the UE 110 may achieve MRDC by establishing a connection to at least one cell corresponding to the 5G NR-RAN 120 and at least one cell corresponding to the LTE-RAN 122. In another exemplary configuration, the UE 110 may achieve MRDC by establishing a connection to at least two cells corresponding to the NG-RAN or other type of similar RAN. Accordingly, the example of a separate 5G NR-RAN 120 and an LTE-RAN 122 is merely provided for illustrative purposes.

Returning to the exemplary network arrangement 100, the UE 110 may connect to the 5G NR-RAN 120 via at least one of the next generation Node B (gNB) 120A or gNB 120B. The UE 110 may connect to the LTE-RAN 122 via at least one of the evolved Node B (eNB) 122A or the eNB 122B. Those skilled in the art will understand that any association procedure may be performed for the UE 110 to connect to the 5G NR-RAN 120 or the LTE-RAN 122. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific cell (e.g., the gNB 120A of the 5g NR-RAN 120). Similarly, for access to LTE services, the UE 110 may associate with eNB 122A. However, as mentioned above, reference to the 5G NR-RAN 120 and the LTE-RAN 122 is merely for illustrative purposes and any appropriate type of RAN may be used.

In addition to the RANs 120 and 122, the network arrangement 100 also includes a cellular core network 130, the Internet 140, an IP Multimedia Subsystem (IMS) 150, and a network services backbone 160. The cellular core network 130 may be considered to be the interconnected set of components that manages the operation/traffic of the cellular network and may include the EPC and/or the 5GC. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
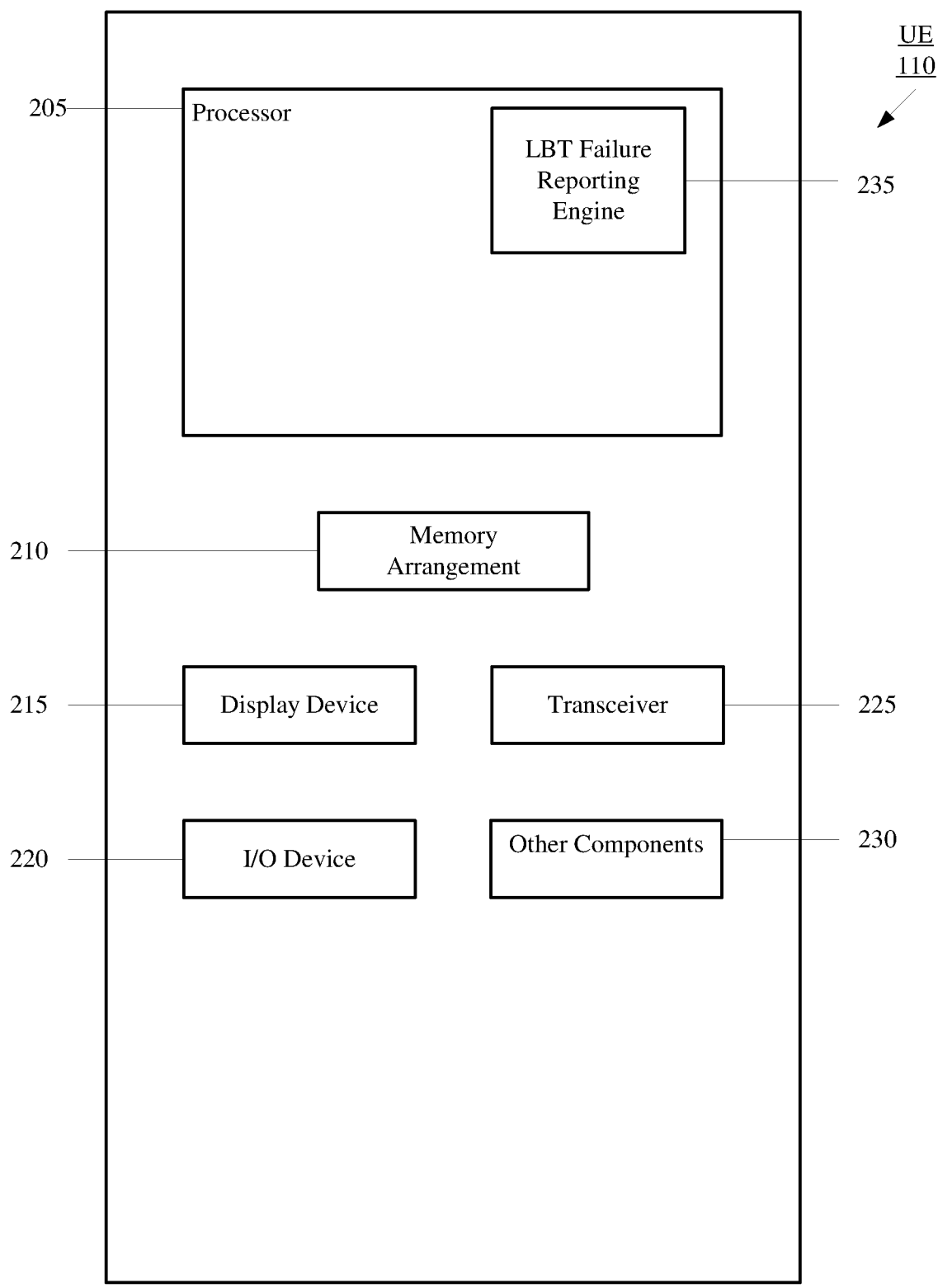
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the UE 110 to other electronic devices, sensors to detect conditions of the UE 110, etc.

The processor 205 may be configured to execute a plurality of engines for the UE 110. For example, the engines may include an LBT failure reporting engine 235. The LBT failure reporting engine 235 may be configured with a variety of different mechanisms for delivering a SpCell uplink LBT failure MAC CE to the network. In a first aspect, the LBT failure reporting engine 235 may trigger a particular exemplary mechanism when certain conditions are present. In a second aspect, the LBT failure reporting engine 235 may determine that the network has received the SpCell uplink LBT failure MAC CE when certain indications are identified.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the LTE-RAN 120, the 5G NR-RAN 122 etc. Accordingly, the transceiver 225 may operate on a variety of different frequencies or channels (e.g., set of consecutive frequencies).

As mentioned above, the exemplary embodiments relate to the UE 110 delivering a SpCell uplink LBT failure MAC CE to the network. The UE 110 may interact with the SpCell in the context of CA and/or MRDC. To provide a general example of the context with which the UE 110 and the SpCell may interact, various aspects of CA and/or MRDC will be described in more detail below. However, any reference to a particular type of RAT, core network, cell or mode of operation is merely provided for illustrative purposes. The exemplary embodiments may apply to any scenario in which the UE 110 is to deliver an indication of one or more uplink LBT failures to the network.

The UE 110 may be configured to access 5G NR services when operating in non-standalone (NSA) mode for 5G or standalone (SA) mode for 5G. In NSA mode, the UE 110 may establish a connection with both a 5G NR RAT and an LTE RAT (e.g., MRDC). For example, when in NSA mode for 5G, the UE 110 may achieve MRDC via a master cell group (MCG) corresponding to 5G NR and a secondary cell group (SCG) corresponding to LTE or vice versa. Each cell group may include at least one cell for a corresponding RAT. In one exemplary scenario of MRDC, from a protocol stack perspective, the UE 110 may have a control plane and a user plane with the 5G NR network while also having a control plane and a user plane with the LTE network. In another exemplary scenario of MRDC, the UE 110 may have a control plane with the LTE network and a user plane with the 5G NR network or vice versa. Thus, when operating in NSA mode for 5G, the UE 110 may have simultaneous connections to 5G NR and LTE (e.g., MRDC). However, it should be noted, that when operating in NSA mode for 5G, the UE 110 may transition between instances of being connected on one RAT (e.g., 5G NR, LTE, Legacy, etc.) to being connected on a multiple RATs (e.g., MRDC).

In SA mode for 5G, the UE 110 may connect to one RAT at a particular time. Accordingly, when deployed, the network connection may transition between different RATs (e.g., 5G NR, LTE, Legacy, etc.). For example, at a first time, the network connection may use the 5GC and the UE 110 may communicate with the network via at least one NR cell (e.g., gNB 120A, gNB 120B). During operation, the UE 110 may experience a handover from the 5G to LTE, where the network connection may then use the EPC and the UE 110 may communicate with network via at least one LTE cell (e.g., eNB 122A, eNB 122B).

The UE 110 may also be configured with carrier aggregation (CA) functionality. Both CA and MRDC relate to the UE 110 being configured with a plurality of component carriers (CCs). Each CC may represent a channel that facilitates communication between the UE 110 and the network over a particular frequency band. Thus, to utilize CA or MRDC the UE 110 may communicate with the network using multiple CCs corresponding to multiple cells.

CA may include a primary component carrier (PCC) and at least one secondary component carrier (SCC) that correspond to the same RAT being used to facilitate communication with the network. The PCC may be used, in part, for control information such as scheduling requests, uplink grants, downlink grants, etc. CA functionality enables the PCC and at least one SCC to combine bandwidths to exchange data with the UE 110. Thus, with CA, the PCC may provide a first portion of a total bandwidth for data to be exchanged while the SCC may provide a second portion of the total bandwidth. To further increase the total available bandwidth for data to be exchanged with the UE 110, additional SCCs may be incorporated.

In SA mode for 5G, the UE 110 may be configured with CA functionality. In NSA mode, the UE may be configured with MRDC and CA simultaneously. That is, the MCG may provide one or more CCs corresponding to a first RAT and the SCG may provide one or more aggregated CCs corresponding to the second RAT.

In CA, a primary cell (PCell) may provide the PCC on one frequency band and one or more secondary cells (SCells) may provide SCCs assigned to other bands. For instance, in the example network arrangement 100, the PCell may be the gNB 120A and the SCell may be the gNB 120B or vice versa. Generally, the PCell refers to the cell that performs control procedures and provides the radio resources control (RRC) connection. In MRDC, separately from the PCell, a primary secondary cell (PSCell) may also perform control procedures. The PCell may correspond to the MCG and the PSCell may correspond to the SCG.

Those skilled in the art will understand that within the context of CA, the term "SpCell" may refer to the PCell. It will be further understood that within the context of MRDC, the term "SpCell" may refer to the PCell of the MCG or the PSCell of the SCG. Generally, the SpCell refers to a cell that supports physical uplink control channel (PUCCH) and/or contention-based random-access procedures.

The above descriptions of SA mode and NSA mode are not intended to limit the exemplary embodiments in any way. Instead, the above descriptions of SA mode and NSA mode are only intended to provide a general example of the context in which the UE 110 and the exemplary SpCell may interact.

The SpCell may operate in the unlicensed spectrum. Thus, for uplink communications to the SpCell, the UE 110 may utilize LBT procedures. If one or more LBT failures occur with a currently camped SpCell, the UE 110 may be triggered to report the one or more uplink LBT failures to the network. In a first aspect, the exemplary embodiments relate to delivering a MAC CE to the network that includes an indication of one or more uplink LBT failures associated with the SpCell. In a second aspect, the exemplary embodiments relate to determining that the network received the SpCell LBT failure MAC CE.

Figure 3:
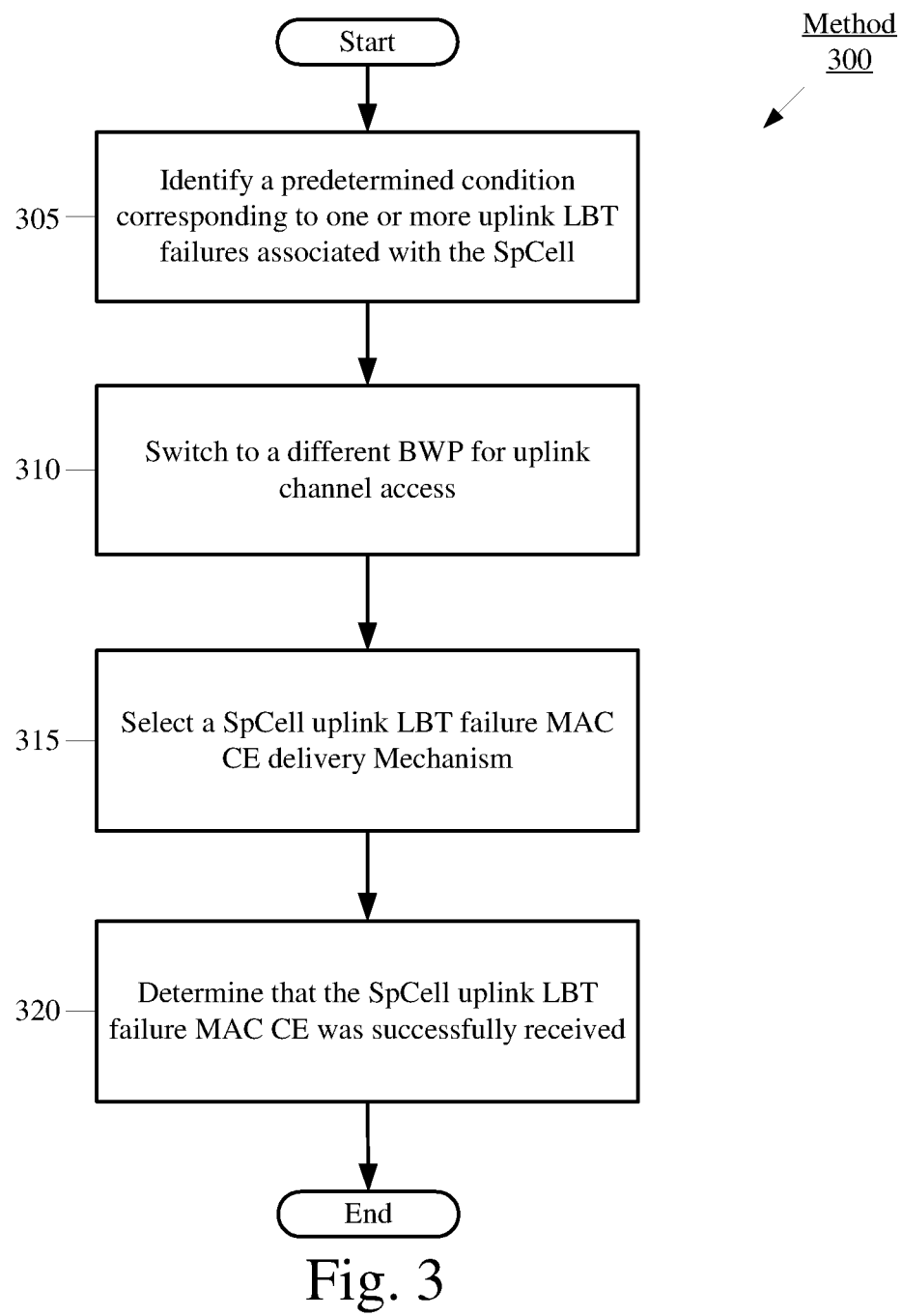
FIG. 3 shows a method for delivering a SpCell uplink LBT failure MAC CE according to various exemplary embodiments.

FIG. 3 shows a method 300 for delivering a SpCell uplink LBT failure MAC CE according to various exemplary embodiments. The method 300 will be described with regard to the UE 110 of FIG. 2 and the network arrangement 100 of FIG. 1.

Initially, consider the following exemplary scenario. The UE 110 is camped on the gNB 120A of the 5G NR-RAN 120. In this scenario, the gNB 120A is an SpCell that operates in the unlicensed spectrum. The UE 110 is configured to perform an LBT procedure for uplink transmissions to the gNB 120A. In some embodiments, the UE 110 may be configured with CA and/or MRDC. Thus, the UE 110 may also be configured to communicate with other cells (e.g., gNB 120B, eNB 122A, eNB 122B) in the uplink and/or downlink.

In 305, the UE 110 identifies a predetermined condition corresponding to one or more uplink LBT failures associated with the SpCell. The occurrence of the predetermined condition may indicate to the UE 110 that the BWP that the UE 110 is currently configured to utilize for uplink transmissions to the SpCell is too congested with traffic to be a viable communication channel for uplink transmissions to the SpCell. As will be explained below, the predetermined condition may trigger the UE 110 to switch to a different BWP and provide an indication of the one or more uplink LBT failures associated with the SpCell (e.g., the SpCell uplink LBT failure MAC CE) to the network. In some embodiments, the BWP switching and delivering the indication of the one or more uplink LBT failures associated with the SpCell may occur during the same procedure. In other embodiments, the BWP switching and delivering indication of the one or more uplink LBT failures associated with the SpCell may occur in different procedures.

The predetermined condition may include one or more instances of uplink LBT failure. For example, the UE 110 may utilize a counter and a timer to track the occurrence of uplink LBT failures associated with the SpCell. When a first LBT failure occurs, the UE 110 may initiate a timer and set the counter to one. If the timer expires before another LBT failure occurs, the counter resets to zero. If another LBT failure occurs before the timer expires, the timer resets and the counter is set to two. In this example, when the counter exceeds a threshold value, the predetermined condition has occurred. Some entities may refer to this concept as consistent LBT failure. However, the above example is not intended to limit the exemplary embodiments in any way. As mentioned above, any reference to a particular set of circumstances triggering the UE to report the one or more uplink LBT failures is merely provided for illustrative purposes. The exemplary embodiments may apply to any appropriate one or more factors triggering the UE to deliver the indication of one or more uplink LBT failures to the network.

In 310, the UE 110 switches to a different BWP for uplink channel access. For example, if the UE 110 is initially configured to utilize BWP (X) for uplink communications with the SpCell, the UE 110 may switch to BWP (Y) in response to identifying the predetermined condition in 305. Switching to a different BWP may include performing a RACH procedure. As will be described in more detail below, in some embodiments, the SpCell uplink LBT failure MAC CE may be delivered to the network by the UE 110 during the RACH procedure. In other embodiments, the SpCell uplink LBT failure MAC CE may be delivered to the network by the UE 110 outside of the RACH procedure.

In 315, the UE 110 selects a SpCell uplink LBT failure MAC CE delivery mechanism. For instance, the SpCell uplink LBT failure MAC CE may be provided to the network in any of a variety of different messages transmitted by the UE 110 to the network (e.g., SpCells, PCells, SCells, etc.). In this example, the UE 110 may select one of the below described messages based on any appropriate selection criteria. However, the exemplary embodiments are not limited to the messages or selection criteria described below and may apply to selecting between any appropriate set of one or messages using any appropriate selection criteria.

Accordingly, the exemplary embodiments relate to a scenario in which the UE 110 is executing two different procedures, e.g., i) BWP switching and ii) SpCell uplink LBT failure MAC CE delivery. While the UE 110 may select a message for SpCell uplink LBT failure MAC CE delivery that is included in the RACH procedure, these two procedure are performed independently from one another and are not required to occur in any particular time sequence.

One exemplary SpCell uplink LBT failure MAC CE delivery mechanism may relate to a message included in a RACH procedure. For example, the SpCell uplink LBT failure MAC CE may be included in message 3 (Msg3) of a four step RACH procedure. The four step RACH procedure may include the UE 110 transmitting a RACH preamble to the network. Those skilled in the art would understand the type of information that may be included in the RACH preamble. In response, the network may transmit a random access response (RAR) transmitted to the UE 110. The RAR may include an uplink grant for the UE 110. In accordance with the uplink grant, the UE 110 may then transmit a MSG3 to the network. In some embodiments, the SpCell uplink LBT failure MAC CE may be included in this message. Those skilled in the art will understand the other types of information that may be included in the MSG3. In the fourth step, the network may transmit a contention resolution message indicating that the UE 110 and the network are synched on this BWP.

In another example, the SpCell uplink LBT failure MAC CE may be included in message A (MSGA) of a two-step RACH procedure. Those skilled in the art will understand that the two step RACH procedure includes a first transmission by the UE 110 to the network. This first step may be the UE 110 transmitting a MSGA to the network which may include information similar to the RACH preamble and MSG3 described above. In some embodiments, the SpCell uplink LBT failure MAC CE may be included in this message. The second step may be the network transmitting a message B (MSGB) to the UE 110 which may include information similar to the RAR and the content resolution message described above.

Another exemplary SpCell uplink LBT failure MAC CE delivery mechanism may relate to utilizing configured grants. Those skilled in the art will understand that the configured grants relate to the concept of grant free scheduling. For example, a cell may reserve resources for uplink transmissions and the UE 110 may be aware of these reserved resources. To perform an uplink transmission, the UE 110 may utilize one of the reserved resources without sending a scheduling request and waiting for the subsequent grant message from the cell. Configured grants provide low latency and may be utilized in use cases such as Ultra Reliable Low Latency Communication (URLLC).

Throughout this description, a "configured grant resource" may refer to a resource that is preassigned to the UE 110 without the UE 110 providing an explicit request for resources to perform the corresponding uplink transmission. As will be described below, in some embodiments, the UE 110 may utilize a configured grant resource on the different BWP (e.g., BWP (Y)) to deliver the SpCell uplink LBT failure MAC CE. In other embodiments, the UE 110 may utilize a configured grant resource on a different cell to deliver the SpCell uplink LBT failure MAC CE.

Figure 4:
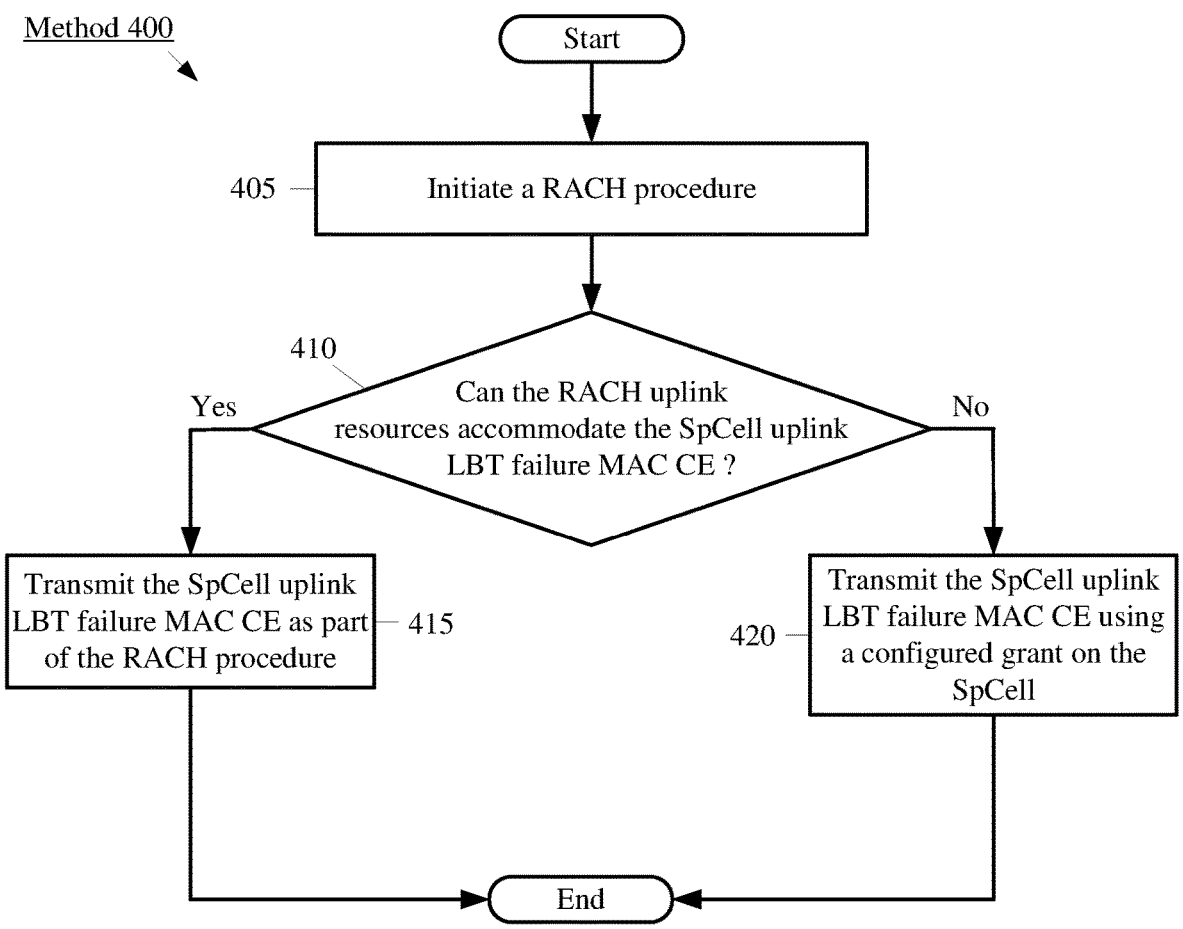
FIG. 4 shows a method for selecting between including the SpCell uplink LBT failure MAC CE in a RACH message or in a configured grant resource on the SpCell according to various exemplary embodiments.

FIG. 4 shows a method 400 for selecting between including the SpCell uplink LBT failure MAC CE in a RACH message or in a configured grant resource on the SpCell according to various exemplary embodiments. The method 400 will be described with regard to the method 300 of FIG. 3, the UE 110 of FIG. 2 and the network arrangement 100 of FIG. 1.

In 405, the UE 110 initiates a RACH procedure to synchronize with the network. As indicated above in 310, the RACH procedure may be performed to switch from a first BWP (e.g., BWP (X)) to a second different BWP (e.g., BWP (Y)).

In 410, the UE 110 determines whether the RACH uplink resources can accommodate the SpCell uplink failure MAC CE. The size of the uplink resources and the information that is to be provided to the network during the RACH procedure may vary. Thus, in some scenarios, there may not be enough space to fit the SpCell uplink failure MAC CE in the RACH uplink resources. As a result, the UE 110 may utilize a configured grant resource on the SpCell to deliver the SpCell uplink LBT failure MAC CE instead of a RACH resource. However, the exemplary embodiments are not limited to selection criteria that includes the size of RACH uplink resources and may select between RACH uplink resources and configured grant resources on the SpCell based on any appropriate one or more factors.

To provide an example, in the context of the four step RACH procedure, the UE 110 may receive an uplink grant in the RAR. The UE 110 is configured to transmit a MSG 3 to the network using the uplink grant. However, for any of a variety of different reasons, the uplink grant resources for MSG3 may not be able to accommodate the SpCell uplink failure MAC CE. Similarly, in the context of the two step RACH procedure, uplink grant resources for MSGA may not be able to accommodate the SpCell uplink failure MAC CE.

If the RACH uplink resources can accommodate the SpCell uplink failure MAC CE, the method 400 may continue to 415. In 415, the UE 110 transmits the SpCell uplink failure MAC CE to the network as part of the RACH procedure.

If the RACH uplink resources cannot accommodate the SpCell uplink failure MAC CE, the method 400 may continue to 420. In 420, the UE 110 transmits the SpCell uplink failure MAC CE to the network using a configured grant resource on the SpCell. For example, configured grant type 1 may be available on the BWP (Y) of the SpCell after the UE 110 completes the RACH procedure. Thus, the RACH procedure may be completed prior to delivering the SpCell uplink failure MAC CE on the configured grant resource. Subsequently, the method 400 ends.

The method 400 described a scenario in which the UE 110 may utilize a configured grant resource on the SpCell. However, if a configured grant resource is available on an SCell, the UE 110 may transmit the SpCell uplink LBT failure MAC CE to the network via a configured grant resource corresponding to an SCell. This type of scenario may be applicable to either CA or MRDC. In this example, since the UE 110 is utilizing a configured grant resource on an SCell, the UE 110 does not have to wait for the RACH procedure with the SpCell to be completed to transmit the SpCell uplink LBT failure MAC CE to the network.

Returning to the method 300, another exemplary SpCell uplink LBT failure MAC CE delivery mechanism may relate to utilizing dynamic grants. A dynamic grant resource may be assigned to the UE 110 based upon a service request (SR) transmitted from the UE 110 to the corresponding cell. Thus, in contrast to configured grants, dynamic grants utilize explicit signaling requests.

Throughout this description, a "dynamic grant resource" may refer to a resource that is assigned in response to a scheduling request (SR) or other similar type of indication. As will be described below, in some embodiments, the UE 110 may utilize a dynamic grant resource on the SpCell to deliver the SpCell uplink LBT failure MAC CE. In other embodiments, the UE 110 may utilize a dynamic grant resource on a different cell (e.g., SCell) to deliver the SpCell uplink LBT failure MAC CE.

Figure 5:
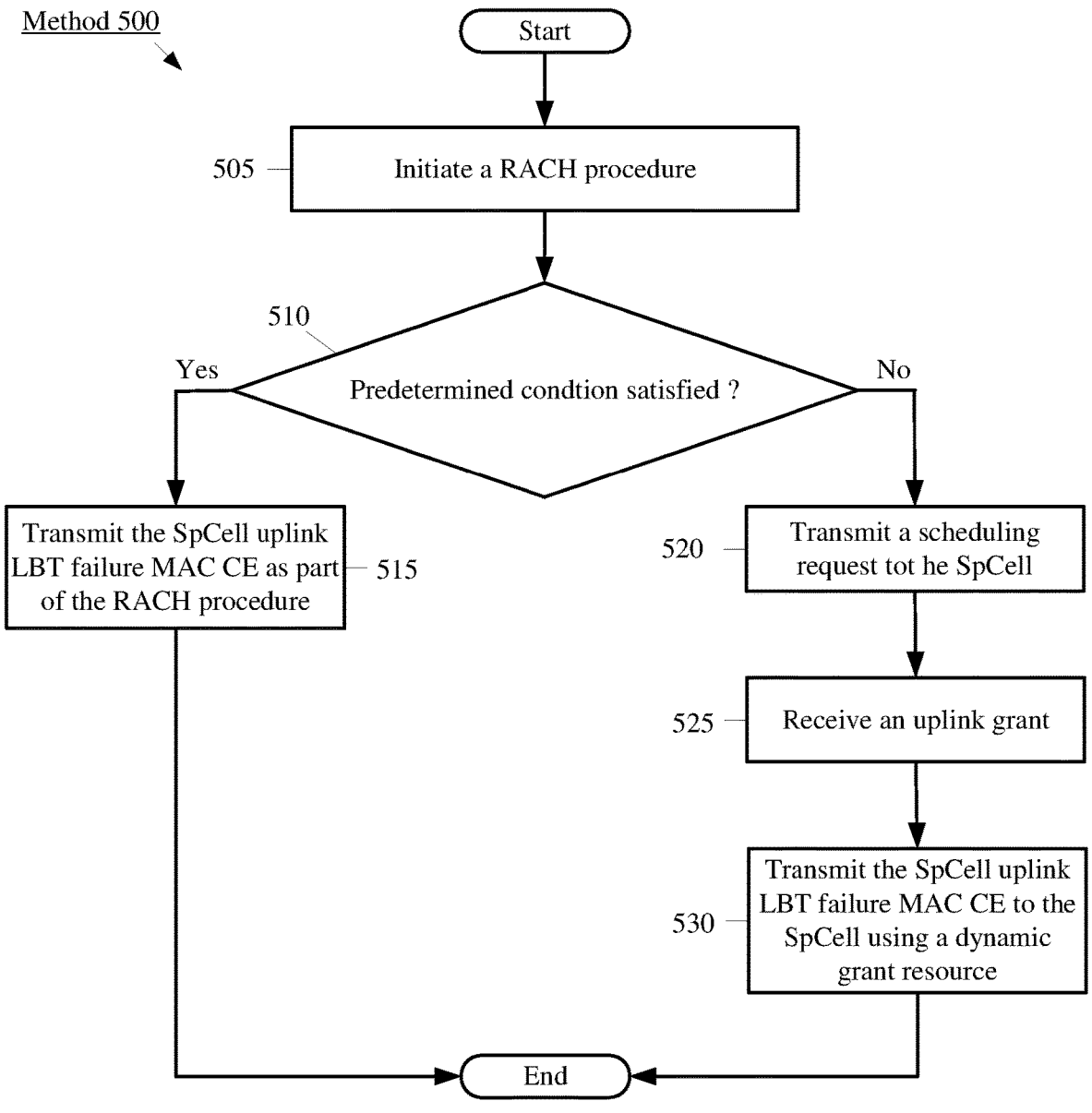
FIG. 5 shows a method for selecting between including the SpCell uplink LBT failure MAC CE in a RACH message or in a dynamic grant resource according to various exemplary embodiments.

FIG. 5 shows a method 500 for selecting between including the SpCell uplink LBT failure MAC CE in a RACH message or in a dynamic grant resource according to various exemplary embodiments. The method 500 will be described with regard to the method 300 of FIG. 3, the UE 110 of FIG. 2 and the network arrangement 100 of FIG. 1.

In 505, the UE 110 initiates a RACH procedure to synchronize with the network. This is substantially similar to 405 of the method 400.

In 510, the UE 110 determines whether a predetermined condition is satisfied. The predetermined condition may indicate to the UE 110 whether a RACH message or a dynamic grant is to be used to deliver the SpCell uplink LBT failure MAC CE. Like 410 of the method 400, the predetermined condition in 510 may consider whether the RACH uplink resources (e.g., uplink grant included in the RAR) can accommodate the SpCell uplink failure MAC CE. The predetermined condition may also consider whether a dynamic grant on a different cell (e.g., SCell) was previously received. However, the exemplary embodiments are not limited to selection criteria that includes the size of RACH uplink resources and whether a dynamic grant on a different cell was previously received. The exemplary embodiments may select between RACH uplink resources and dynamic grant resources on the SpCell based on any appropriate one or more factors.

If the RACH uplink resources can accommodate the SpCell uplink failure MAC CE and a dynamic grant on a different cell was not previously received, the method 500 continues to 515. In 515, the UE 110 transmits the SpCell uplink failure MAC CE to the network as part of the RACH procedure.

If the RACH uplink resources cannot accommodate the SpCell uplink failure MAC CE and/or a dynamic grant resource on a different cell was previously received, the method 500 continues to 520. In 520, the UE 110 transmits a SR to the SpCell. For example, after the RACH procedure is complete and the UE 110 is synchronized with the network on the different BWP (Y), the UE 110 may transmit a SR to the SpCell to request an uplink grant for dynamic grant resources.

In 525, the UE 110 receives an uplink grant in response to the scheduling request. In 530, the UE 110 transmits the SpCell uplink LBT failure MAC CE to the SpCell using the dynamic grant resources indicated in the uplink grant. Subsequently, the method 500 ends.

The method 500 described a scenario in which the UE 110 may utilize a dynamic grant resource on the SpCell. However, as indicated above, if a dynamic grant resource is available on an SCell, the UE 110 may utilize the dynamic grant resources on the SCell to deliver the SpCell uplink LBT failure MAC CE to the network. This type of scenario may be applicable to either CA or MRDC. In this example, since the UE 110 is utilizing a dynamic grant resource on a SCell, the UE 110 does not have to wait for the RACH procedure with the SpCell to be completed to transmit the SpCell uplink LBT failure MAC CE to the network.

Returning to the method 300, after the UE 110 selects a SpCell uplink LBT failure MAC CE delivery mechanism, the method 300 continues to 320. In 320, the UE 110 determines that the SpCell uplink LBT failure MAC CE was successfully delivered.

In one embodiment, successful delivery may be assumed based on the RACH procedure. For instance, consider a scenario in which the UE 110 transmitted the SpCell uplink LBT failure MAC CE to the network in MSG3 of the RACH procedure. MSG3 may also include cell radio network temporary identifier (C-RNTI) which is used to by the cell to differentiate between connected UEs. If MSG4 addresses the UE 110 using the C-RNTI, the UE 110 may assume that MSG3 was successfully received and thus, the SpCell uplink LBT failure MAC CE may be considered successfully received.

In another embodiment, successful delivery may be assumed based on a hybrid automatic repeating request (HARQ) acknowledgement (ACK). For instance, consider a scenario in which the UE 110 transmitted the SpCell uplink LBT failure MAC CE to the network in a configured grant resource. When utilizing configured grants, the UE 110 may be configured to receive ACKs/negative acknowledgements (NACKS) via downlink feedback information (DFI). Thus, if the UE 110 receives an ACK indicating successful reception of the information transported via the configured grant resources, the UE 110 may assume that the SpCell uplink LBT failure MAC CE was successfully received.

In another embodiment, successful delivery may be assumed based on a timer. For instance, consider a scenario in which the UE 110 transmitted the SpCell uplink LBT failure MAC CE to the network in a dynamic grant resource. When the SpCell uplink LBT failure MAC CE is transmitted on the dynamic grant resources the UE 110 may initiate a timer. The timer may be configured to be reset if the UE 110 receives downlink control information (DCI) to schedule a retransmission on the PUSCH with the same HARQ process ID as the SpCell uplink LBT failure MAC CE. That is, the UE 110 may assume that the SpCell uplink LBT failure MACE CE has not been successfully received if the UE 110 receives a DCI to schedule a retransmission in response to the PUSCH transmission that included the SpCell uplink LBT failure MACE CE on the dynamic resource. If the timer expires, the UE 110 may assume that the network successfully received the SpCell uplink LBT failure MAC CE because no retransmissions were scheduled. Subsequently, the method 300 ends. However, the above examples were merely provided for illustrative purposes, the exemplary embodiments are not limited to the indications described above and may assume that the SpCell uplink failure MAC CE was successfully received by the network based on any appropriate indication.

Methods 300-500 describe a SpCell uplink LBT failure MAC CE delivery procedure that was separate from but may consider aspects of a RACH procedure performed for BWP switching. However, taking the RACH procedure into account may introduce latency into the delivery of the indication of one or more uplink LBT failures. To avoid the latency that may be caused by the RACH procedure, the UE 110 may instead indicate the BWP switching via an SCell. For example, if the UE 110 is configured with an SCell that supports uplink communication, the UE 110 can indicate BWP switching to the SCell using a BWP Switch MAC CE instead of the RACH procedure. The contents of the BWP Switch MAC CE may include, but are not limited to, a local channel identified (LCID), a cell ID representing the cell of the BWP, a target BWP ID representing the BWP the UE 110 is switching to, etc. If the UE 110 receives an uplink grant to schedule a new transmission for the same HARQ process as the PUSCH carrying the BWP Switch MAC CE, the UE 110 may assume that the indication of the BWP switch was successfully received, and the network is aware of the BWP switch.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
    at a user equipment (UE) connected to a network:
        identifying a predetermined condition corresponding to one or more uplink listen-before-talk (LBT) failures associated with a special cell (SpCell), wherein the UE is triggered to provide an indication of uplink LBT failure associated with the SpCell to the network based on the predetermined condition;
        determining a type of message that is to be used to deliver the indication of uplink LBT failure associated with the SpCell to the network, wherein the type of message is an indication of bandwidth part (BWP) switching by the UE that is to be transmitted to a secondary cell (SCell);
        transmitting the type of message including the indication of uplink LBT failure associated with the SpCell to the network; and
        determining that the network received the indication of uplink LBT failure associated with the SpCell.

2. The method of claim 1, wherein determining the type of message includes determining whether an uplink grant received during a random access channel (RACH) procedure with the SpCell is able to accommodate the indication of uplink LBT failure associated with the SpCell.

3. The method of claim 2, further comprising:
    when the uplink grant received during the RACH procedure is able to accommodate the indication of uplink LBT failure associated with the SpCell, transmitting the indication of uplink LBT failure associated with the SpCell to the SpCell during the RACH procedure, wherein the type of message is a message 3 (MSG3).

4. The method of claim 2, further comprising:
    when the uplink grant received during the RACH procedure is not able to accommodate the indication of uplink LBT failure associated with the SpCell, transmitting the indication of uplink LBT failure associated with the SpCell on a configured grant resource assigned by the SpCell.

5. The method of claim 4, wherein transmitting the indication of uplink LBT failure associated with the SpCell is performed after the RACH procedure is complete.

6. The method of claim 2, further comprising:
    when the uplink grant received during the RACH procedure is not able to accommodate the indication of uplink LBT failure associated with the SpCell, transmitting the indication of uplink LBT failure associated with the SpCell on a dynamic grant resource assigned by the SpCell.

7. The method of claim 1, wherein determining the type of message includes determining whether the UE has been assigned a dynamic grant resource by a secondary cell (SCell) and when the UE has been assigned the dynamic grant resources by the SCell, transmitting the indication of uplink LBT failure associated with the SpCell to the SCell on the dynamic grant resource assigned by the SCell.

8. The method of claim 1, wherein determining that the network received the indication is based on receiving an uplink grant to schedule a new transmission for a hybrid automatic repeat request (HARQ) process.

9. The method of claim 1, wherein determining that the network received the indication is based on one of i) a cell radio network temporary identifier (C-RNTI) corresponding to the UE included in a message 4 (MSG4) of the a random access channel (RACH) procedure, ii) receiving a hybrid automatic repeating request (HARQ) acknowledgement (ACK) via downlink feedback information (DFI), or iii) an expiration of a timer initiated relative to the transmission of the indication of uplink LBT failure.

10. A user equipment (UE), comprising:
    a transceiver configured to communicate with a network; and
    a processor configured to perform operations, the operations comprising:
        identifying a predetermined condition corresponding to one or more uplink listen-before-talk (LBT) failures associated with a special cell (SpCell), wherein the UE is triggered to provide an indication of uplink LBT failure associated with the SpCell to the network based on the predetermined condition;
        determining a type of message that is to be used to deliver the indication of uplink LBT failure associated with the SpCell to the network, wherein the type of message is an indication of bandwidth part (BWP) switching by the UE that is to be transmitted to a secondary cell (SCell);
        transmitting the type of message including the indication of uplink LBT failure associated with the SpCell to the network; and
        determining that the network received the indication of uplink LBT failure associated with the SpCell.

11. The UE of claim 10, wherein determining the type of message includes determining whether an uplink grant received during a random access channel (RACH) procedure with the SpCell is able to accommodate the indication of uplink LBT failure associated with the SpCell and when the uplink grant received during the RACH procedure is not able to accommodate the indication of uplink LBT failure associated with the SpCell, transmitting the indication of uplink LBT failure associated with the SpCell on a configured grant resource assigned by the SpCell.

12. The UE of claim 10, wherein determining the type of message includes determining whether an uplink grant received during a random access channel (RACH) procedure with the SpCell is able to accommodate the indication of uplink LBT failure associated with the SpCell and when the uplink grant received during the RACH procedure is not able to accommodate the indication of uplink LBT failure associated with the SpCell, transmitting the indication of uplink LBT failure associated with the SpCell on a dynamic grant resource assigned by the SpCell.

13. The UE of claim 10, wherein determining the type of message includes determining whether the UE has been assigned a dynamic grant resource by a secondary cell (SCell) and when the UE has been assigned the dynamic grant resources by the SCell, transmitting the indication of uplink LBT failure associated with the SpCell to the SCell on the dynamic grant resource assigned by the SCell.

14. The UE of claim 10, wherein determining that the network received the indication is based on one of i) a cell radio network temporary identifier (C-RNTI) corresponding to the UE included in a message 4 (MSG4) of the a random access channel (RACH) procedure or ii) receiving a hybrid automatic repeating request (HARQ) acknowledgement (ACK) via downlink feedback information (DFI).

15. An integrated circuit, comprising:
    circuitry configured to identify a predetermined condition corresponding to one or more uplink listen-before-talk (LBT) failures associated with a special cell (SpCell), wherein a user equipment (UE) is triggered to provide an indication of uplink LBT failure associated with the SpCell to a network based on the predetermined condition;
    circuitry configured to determine a type of message that is to be used to deliver the indication of uplink LBT failure associated with the SpCell to the network, wherein the type of message is an indication of bandwidth part (BWP) switching by the UE that is to be transmitted to a secondary cell (SCell);
    circuitry configured to transmit the type of message including the indication of uplink LBT failure associated with the SpCell to the network; and
    circuitry configured to determine that the network received the indication of uplink LBT failure associated with the SpCell.

16. The integrated circuit of claim 15, wherein determining the type of message includes determining whether an uplink grant received during a random access channel (RACH) procedure with the SpCell is able to accommodate the indication of uplink LBT failure associated with the SpCell and when the uplink grant received during the RACH procedure is not able to accommodate the indication of uplink LBT failure associated with the SpCell, the indication of uplink LBT failure associated with the SpCell is transmitted on a configured grant resource assigned by the SpCell.

17. The integrated circuit of claim 15, wherein determining the type of message includes determining whether an uplink grant received during a random access channel (RACH) procedure with the SpCell is able to accommodate the indication of uplink LBT failure associated with the SpCell and when the uplink grant received during the RACH procedure is not able to accommodate the indication of uplink LBT failure associated with the SpCell, the indication of uplink LBT failure associated with the SpCell is transmitted on a dynamic grant resource assigned by the SpCell.

18. The integrated circuit of claim 15, wherein determining the type of message includes determining whether a dynamic grant resource has been assigned by a secondary cell (SCell) and when the dynamic grant resource has been assigned by the SCell, the indication of uplink LBT failure associated with the SpCell is transmitted to the SCell on the dynamic grant resource assigned by the SCell.

19. The integrated circuit of claim 15, wherein determining that the network received the indication is based on an expiration of a timer initiated relative to the transmission of the indication of uplink LBT failure.

* * * * *